United States Patent
Erturk et al.

(10) Patent No.: US 7,457,116 B2
(45) Date of Patent: Nov. 25, 2008

(54) METHOD AND SYSTEM TO COOL MEMORY

(75) Inventors: Hakan Erturk, Phoenix, AZ (US); Gregory M. Chrysler, Chandler, AZ (US); Ioan Sauciuc, Pheonix, AZ (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 11/646,065

(22) Filed: Dec. 27, 2006

(65) Prior Publication Data

US 2008/0158812 A1 Jul. 3, 2008

(51) Int. Cl.
*H05K 7/20* (2006.01)
*H01L 23/36* (2006.01)

(52) U.S. Cl. ............... 361/696; 361/695; 361/687; 361/699; 165/80.3; 165/80.4; 165/104.33; 165/185; 62/259.2; 174/15.1

(58) Field of Classification Search ......... 361/687–691, 361/694–701, 711, 719–721, 785, 788; 165/80.2, 165/80.3, 80.4, 104.33, 106.33, 106.36, 106.21, 165/80.6, 185; 62/259.1, 259.2, 263, 440; 454/184; 29/740, 741, 890.032; 174/15.2, 174/16.3, 252
See application file for complete search history.

(56) References Cited

U.S. PATENT DOCUMENTS

| | | | |
|---|---|---|---|
| 4,352,274 A * | 10/1982 | Anderson et al. | 62/229 |
| 5,706,668 A * | 1/1998 | Hilpert | 62/259.2 |
| 6,205,796 B1 * | 3/2001 | Chu et al. | 62/94 |
| 6,305,180 B1 * | 10/2001 | Miller et al. | 62/259.2 |
| 6,422,304 B1 * | 7/2002 | Slovikosky | 165/80.4 |
| 6,438,984 B1 * | 8/2002 | Novotny et al. | 62/259.2 |
| 6,467,295 B2 * | 10/2002 | Oh et al. | 62/259.2 |
| 6,493,223 B1 * | 12/2002 | Viswanath et al. | 361/690 |
| 6,587,343 B2 * | 7/2003 | Novotny et al. | 361/698 |
| 6,591,898 B1 * | 7/2003 | Chu et al. | 165/80.4 |
| 6,628,520 B2 * | 9/2003 | Patel et al. | 361/696 |
| 6,925,829 B2 * | 8/2005 | Wei | 62/259.2 |
| 6,997,006 B2 * | 2/2006 | Kameyama et al. | 62/259.2 |
| 7,002,799 B2 * | 2/2006 | Malone et al. | 361/699 |
| 7,164,580 B2 * | 1/2007 | DiStefano | 361/687 |
| 7,203,063 B2 * | 4/2007 | Bash et al. | 361/699 |
| 7,252,139 B2 * | 8/2007 | Novotny et al. | 165/80.2 |
| 7,278,467 B2 * | 10/2007 | Huang et al. | 165/80.4 |
| 2002/0105779 A1 * | 8/2002 | Lei et al. | 361/687 |
| 2005/0061013 A1 * | 3/2005 | Bond | 62/259.2 |
| 2006/0028800 A1 * | 2/2006 | Chrysler et al. | 361/700 |

FOREIGN PATENT DOCUMENTS

JP 401270296 A * 10/1989

* cited by examiner

*Primary Examiner*—Michael V Datskovskiy
(74) *Attorney, Agent, or Firm*—Buckley, Maschoff & Talwalkar LLC

(57) ABSTRACT

A method, apparatus, and system related to thermal management. The method includes reducing a temperature of a stream of air upstream of at least one memory module by a heat absorption component of a refrigeration device, moving the stream of air into contact with at least one surface of the at least one memory module and transferring heat provided by the at least one memory module and a heat rejection component of the refrigeration device to a location downstream of the at least one memory module.

18 Claims, 5 Drawing Sheets

100

```
┌─────────────────────────────────────────────────────┐
│  REDUCE TEMPERATURE OF A STREAM OF AIR UPSTREAM     │
│  OF AT LEAST ONE MEMORY MODULE BY A HEAT ABSORPTION │
│       COMPONENT OF A REFRIGERATION DEVICE           │
│                                              105    │
└─────────────────────────────────────────────────────┘
                          │
                          ▼
┌─────────────────────────────────────────────────────┐
│    MOVE THE STREAM OF COOLED AIR INTO CONTACT WITH AT│
│    LEAST ONE SURFACE OF THE AT LEAST ONE MEMORY MODULE│
│                                              110    │
└─────────────────────────────────────────────────────┘
                          │
                          ▼
┌─────────────────────────────────────────────────────┐
│         TRANSFER HEAT PROVIDED BY THE AT LEAST ONE  │
│    MEMORY MODULE AND A HEAT REJECTION COMPONENT     │
│      OF THE REFRIGERATION DEVICE TO A LOCATION      │
│     DOWNSTREAM OF THE AT LEAST ONE MEMORY MODULE    │
│                                              115    │
└─────────────────────────────────────────────────────┘
```

*FIG. 1*

METHOD AND SYSTEM TO COOL MEMORY

BACKGROUND

As microprocessors advance in complexity and operating rate and memory modules increase in density, the heat generated by microprocessors and memory modules during operation increases the demands placed on cooling systems for systems and devices having microprocessors, memory modules, and other components co-located therewith. For example, in addition to the heat dissipated by a memory module, the memory module may be further heated by an air temperature increase due to an increase in heat dissipated by other components co-located near the memory module (e.g., same printed circuit board, PCB, and/or housing).

However, a number of proposed cooling systems for microprocessors and memory modules include attaching, connecting, or otherwise placing a cooling surface (e.g., a heat spreading plate or cold plate) in direct (i.e., physical) contact with the memory module or microprocessor. An issue with such systems includes limitations due to the physical contact between the cooling system and the subject memory module and microprocessor.

BRIEF DESCRIPTION OF THE DRAWINGS

FIG. 1 is an exemplary flow diagram of a process, in accordance herewith;

DETAILED DESCRIPTION

Figure 2:
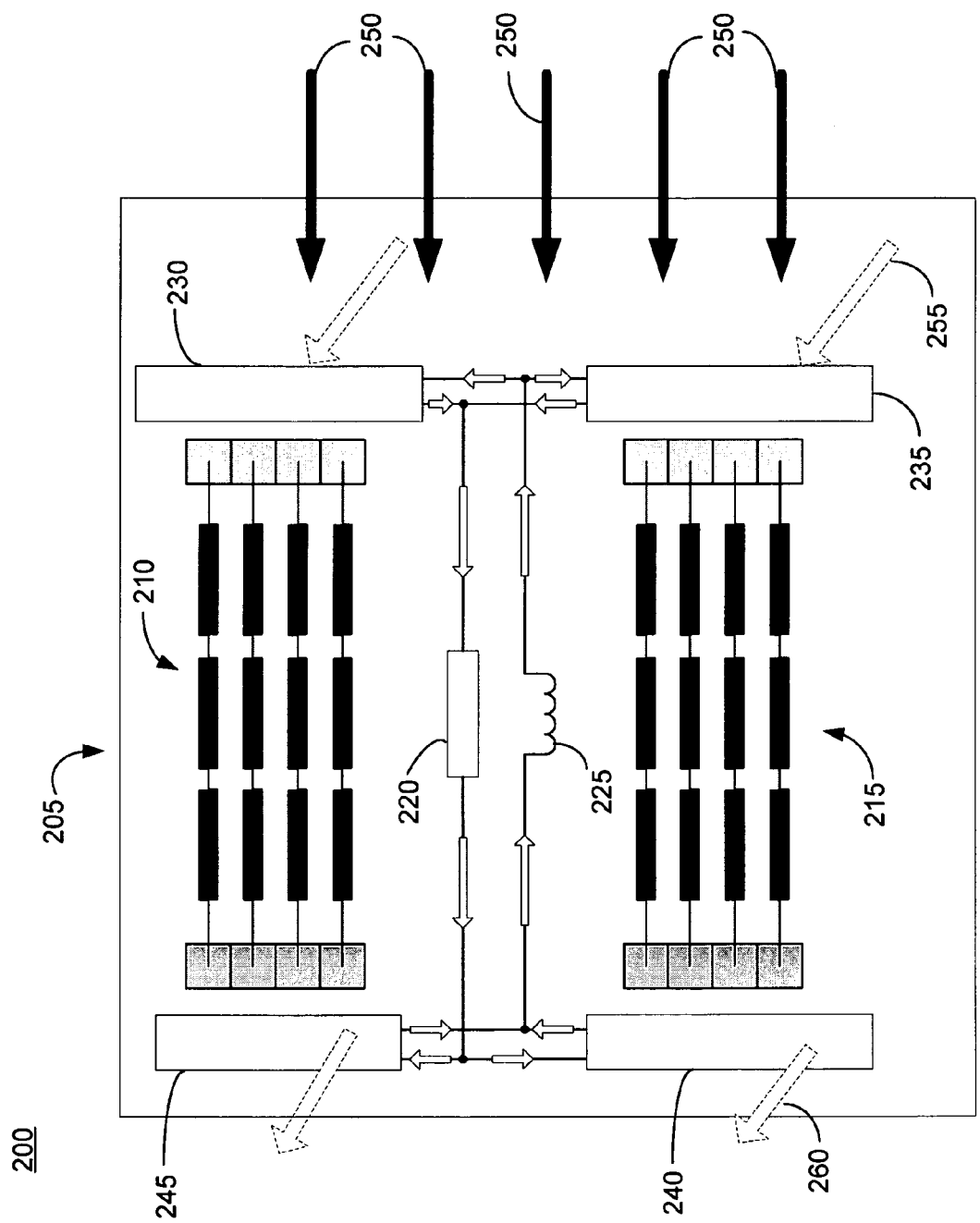
FIG. 2 is an illustrative schematic diagram of an apparatus, in accordance with some embodiments herein.

FIG. 1 is an exemplary flow diagram of a process 100, in accordance with some embodiments herein. At an initial operation 105 of process 100, the temperature of a stream of air upstream of at least one memory module is reduced to a cooler temperature. The temperature cooling of operation 105 may be accomplished by a heat absorption component of a refrigeration device. For example, the refrigeration device may include a closed-loop refrigeration system that circulates a liquid coolant and the heat absorption component may include an evaporator of the refrigeration device.

At operation 110, the stream of air cooled by operation 105 is moved over the at least one memory module. In some embodiments, the stream of cooled air is moved over at least one surface of the at least one memory module. As the cooled air moves over the surface area(s) of the at least one memory module the cooled air stream effectively cools the at least one memory module. Heat dissipated by the at least one memory module is transferred from the at least one memory module to the air stream as the air moves across the surface(s) of the at least one memory module.

In some embodiments, the temperature of the stream of air is reduced to at least an upper temperature of a safe operating temperature range for the at least one memory module. In some embodiments, the temperature is reduced greater than the upper temperature of the safe operating temperature range for the at least one memory module. The greater temperature reduction may be provided such that the air stream is sufficiently cooled to offset a potential temperature increase that may be contributed by, for example, heat dissipated by the memory module and other electronic components (e.g., a microprocessor).

At operation 115, heat is transferred to a location downstream of the at least one memory module. In some embodiments, the heat that is transferred includes heat dissipated by the at least one memory module and heat dissipated by the refrigeration device. In some instances, the heat dissipated by the refrigeration device is attributable to a heat rejection component, such as, for example, a condenser.

By transferring the heat to a location downstream of the at least one memory module, the potential to raise the temperature of the environment immediately surrounding the at least one memory module is reduced or eliminated. Accordingly, a potential to "re-heat" the at least one memory module with heat previously dissipated by the memory module is avoided.

In some embodiments, the air stream is cooled immediately prior to moving the air stream over the at least one memory module. It should be appreciated that by cooling the temperature of the air stream immediately prior to moving the air stream over the memory module(s), the cooled air stream may be at or near a desired cooling temperature. That is, the exposure of the air stream to a heat source before it moves over the memory module(s) is reduced or eliminated due to a close proximity of location between the cooling location of the air stream and the memory module(s).

It should be appreciated that, in accordance with some embodiments herein, the heat may be transferred to a location remote from the memory module(s). As used herein, the term remote may refer to a location outside of an area surrounding the at least one memory module which when heated would contribute to an increase in the temperature of the memory module(s).

FIG. 2 is an illustrative schematic diagram of an apparatus 200, in accordance with some embodiments herein. Apparatus 200 includes a printed circuit board (PCB) 205 to which is connected or mounted a memory bank 210, a memory bank 215, and a refrigeration device that includes compressor 220, condensers 240 and 245, throttling valve 225, and evaporators 230 and 235. In some embodiments, compressor 220 acts to compress a vapor of a refrigerant (not shown) causing it to become a hot, high pressure gas. The gas then flows to condensers 240 and 245 whereupon the gas is condensed to a liquid by dissipating a certain amount of heat. Throttling valve 225 facilitates passing the liquid from a high pressure zone to a low pressure zone. At evaporators 230 and 235, the coolant evaporates to a cold, low pressure gas absorbing heat in the process.

Evaporators 230 and 235 may operate to cool a stream of inlet air flowing in the direction indicated by absorbing heat from the inlet air to effectively reduce the temperature of the inlet air. Arrow 255 is a depiction of a quantity of heat removed from ambient air. The cooled air may then proceed to flow over and into contact with memory modules 210 and 215. As shown, evaporators 230 and 235 are upstream of memory modules 210 and 215.

It is noted that while evaporators 230 and 235 may be located in close proximity to or adjacent to memory modules 210 and 215, neither evaporators 230 and 235 nor any other component of the refrigeration device is in physical contact with memory modules 210 and 215.

Heat dissipated by memory modules 210 and 215 and the refrigeration device may be transferred from a local vicinity of memory modules 210 and 215 to a location away from the memory modules. As shown, condensers 240 and 245 that transfer heat are located downstream of the memory modules 210 and 215. In some embodiments, the downstream location of condensers 240 and 245 and the flow of the air stream as indicated by arrows 250 combines to displace the heat dissipated by the memory modules and the refrigeration device away from the memory modules. Arrows 260 depict the summation of the heat removed from the air by evaporators 230, 235 (shown by arrow 255) and the compression work (i.e., the work input in to compressors 240, 245).

Figure 3:
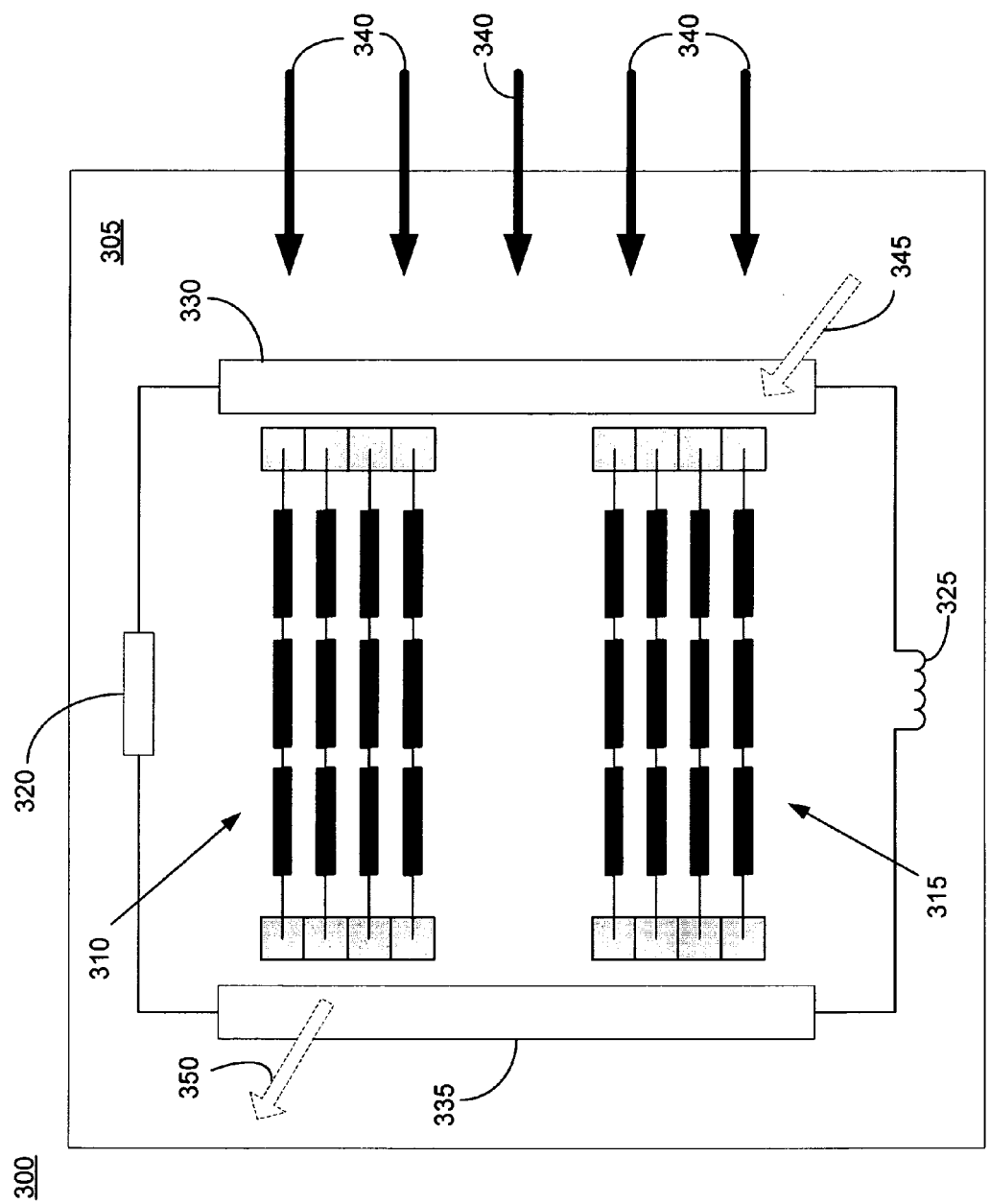
FIG. 3 is an illustrative schematic diagram of an apparatus, in accordance with some embodiments herein.

FIG. 3 is an illustrative schematic diagram of an apparatus 300, in accordance with some embodiments herein. Apparatus 300 includes a PCB 305 to which are mounted memory banks 310 and 315 and a refrigeration device that includes a compressor 320, a condenser 335, a throttling valve 325, and an evaporator 330. The refrigeration device of FIG. 3 may work in a manner similar to the refrigeration device of FIG. 2, thus a detailed discussion of the similar components of FIG. 3 is not seen as necessary. The air stream in FIG. 3 flows in the direction of arrows 340. Heat is introduced into the refrigeration device as indicated by arrow 345 and removed or transferred therefrom as indicated by arrow 350.

Device 300 provides an illustrative example of the flexibility of the thermal management process, apparatus, and systems encompassed by the present disclosure. For example, since none of the components of the refrigeration devices herein physically connect to or interface with the memory modules the memory modules need not be redesigned or retro-fitted to facilitate the thermal management processes and systems herein. In some embodiments, the refrigeration devices, systems, and components disclosed herein may be configured to cool memory modules by adhering to the disclosed placement of the heat absorption (upstream) and heat rejecting (downstream) components. In some embodiments, one or more banks or units of memory modules may be combined or separated, as shown in FIGS. 2 and 3.

Figure 4:
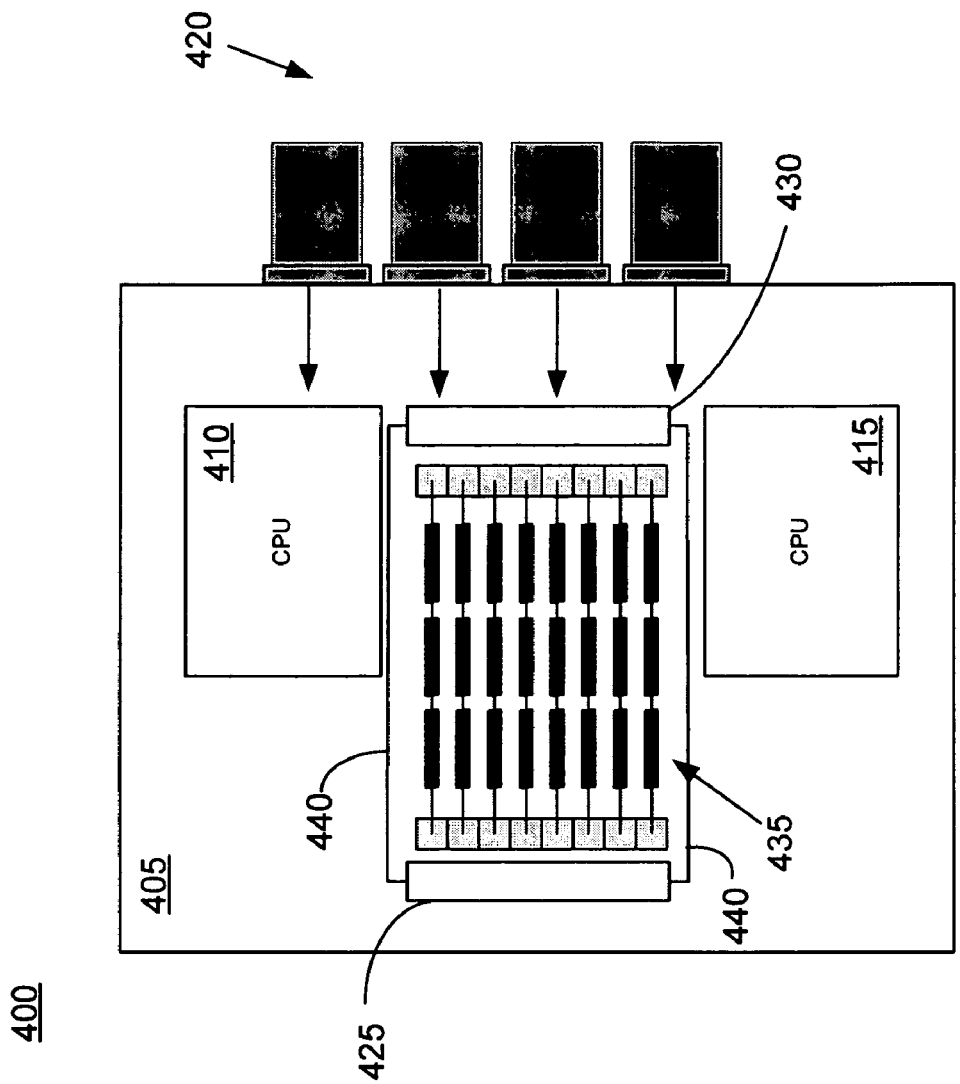
FIG. 4 is an illustrative schematic diagram of a system, according to some embodiments herein.

FIG. 4 is an illustrative schematic diagram of a system 400, in accordance with some embodiments herein. System 400 includes a PCB 405. Mounted to PCB 405 are two processors 410 and 415 (e.g., CPU), a refrigeration system that includes a compressor (not shown), a condenser 425, throttling valve (not shown), and an evaporator 430, and a number of fan devices 420 to maintain a flow of air in the indicated direction. Fan devices 420 may include a fan, a blower, or any other form of air handler. Supply lines 440 provide a connection between evaporator 430, condenser 425, and other components of the refrigeration system (not shown).

In some embodiments, the refrigeration system of FIG. 4 operates in a manner described herein with respect to FIGS. 2 and 3. Accordingly, the basic functions of the components of the refrigeration device of FIG. 4 are not discussed in detail. Operationally, fan devices 420 may invoke and maintain a flow of air in the indicated direction. Prior to memory module 435, evaporator 430 reduces the temperature of a stream of air flowing in the direction of the memory module to a desired temperature. The desired temperature may be within a specified operating temperature for memory module 435. The cooled air flows over memory module 435 with the assistance of fan devices 420. The heat dissipated by memory modules is removed as the cooled air moves to condenser. Then at the condenser the heat removed from the air at the evaporator together with the compression work is dissipated to the air stream. In some embodiments, the heat dissipated by the condenser and the memory module(s) may be expelled to an exterior location of a chassis, housing, cabinet, enclosure, or other operating environment.

It should be appreciated that additional, fewer, and substitute devices other than CPU's 410 and 415 may be included in system 400. It is also noted that in some embodiments the temperature of the air stream to pass over the memory modules may be sufficiently cooled to offset an initial ambient temperature and other heat sources such as, for example, CPU's 410 and 415. In this manner, the cooled air stream may provide and maintain the memory modules at an acceptable and specified safe operating temperature.

In some embodiments, the thermal management methods and apparatuses herein may be used in combination with other heat management devices and systems. For example, in some embodiments a device or component such as, for example, a memory module may have a heat sink attached thereto to aid the dissipation of heat. In accordance with the present disclosure, cooled air may be passed over the memory module to cool the memory module and the heat sink to cool the heat sink attached to the memory module.

Figure 5:
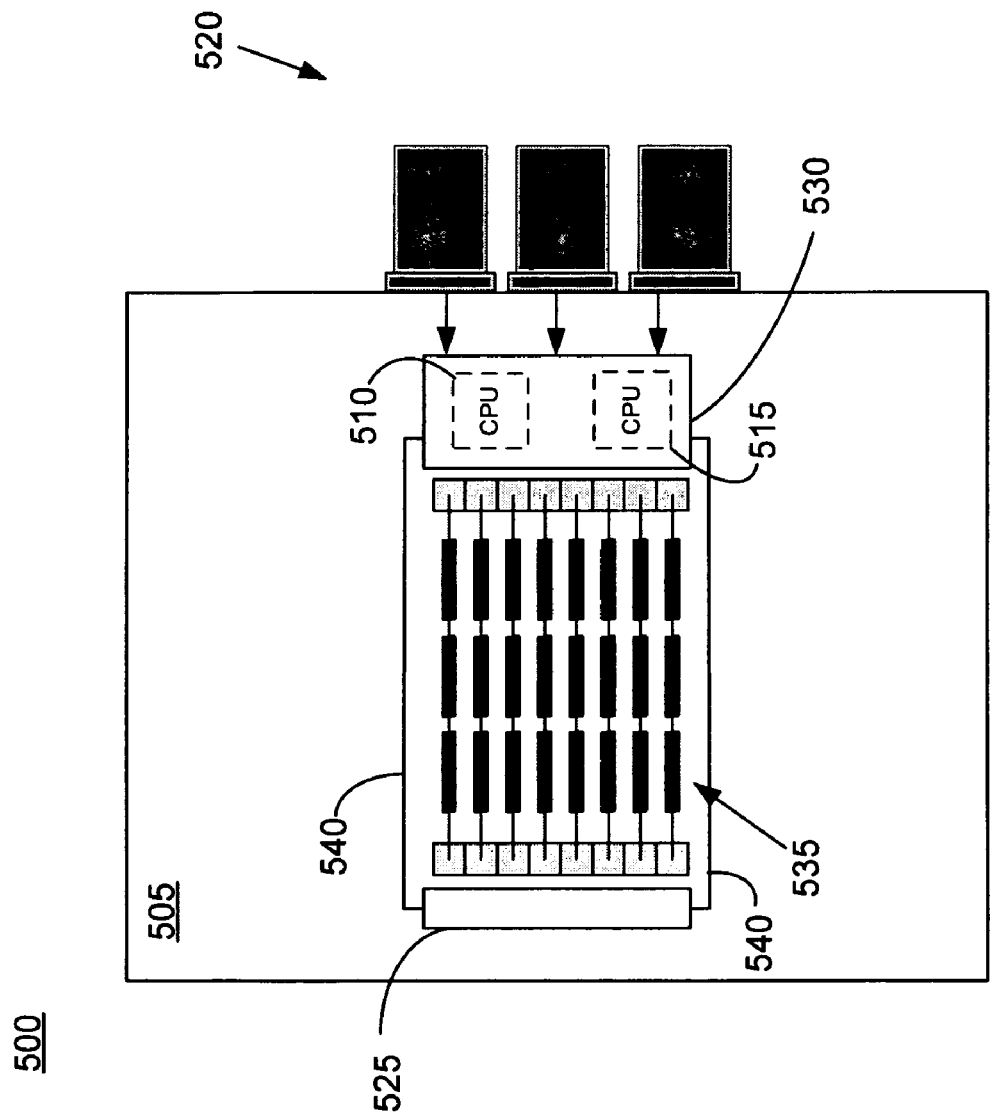
FIG. 5 is an illustrative schematic diagram of a system 500, in accordance with some embodiments herein.

FIG. 5 is an illustrative schematic diagram of a system 500, in accordance with some embodiments herein. System 500 includes a PCB 505. Mounted to PCB 505 are two processors 510 and 515 (e.g., CPU), a refrigeration system that includes a compressor (not shown), a condenser 525, throttling valve (not shown), and a heat exchanger 530, and a number of fan devices 520 to circulate a flow of air in the indicated direction. Supply lines 540 provide a connection between evaporator 530, condenser 525, and other components of the refrigeration system (not shown).

In some aspects, the refrigeration system of FIG. 5 operates in a manner described herein with respect to FIGS. 2 and 3. Accordingly, the basic functions of the components of the refrigeration device of FIG. 4 are not discussed in detail. However, heat exchanger 530 includes a cold plate to cool the CPUs (510, 515) and the air circulated by fan devices 520.

Operationally, fan devices 520 may invoke and circulate a flow of air in the indicated direction. Prior to memory module 535, heat exchanger 530 reduces the temperature of a stream of air flowing in the direction of the memory module to a desired temperature. The desired temperature may be within a specified operating temperature for memory module 535. The cooled air flows over memory module 535 with the assistance of fan devices 520. The heat dissipated by memory modules is removed as the cooled air moves to condenser. Then at the condenser the heat removed from the air at the evaporator together with the compression work is dissipated to the air stream. In some embodiments, the heat dissipated by the condenser and the memory module(s) may be expelled to an exterior location of a chassis, housing, cabinet, enclosure, or other operating environment.

It should be appreciated that additional, fewer, and substitute devices other than CPU's 510 and 515 may be included in system 500.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method, comprising:

reducing a temperature of a stream of air upstream of at least one a first memory module and a second memory module by a heat absorption component of a refrigeration device located adjacent to but not in physical contact with each of the at least first and second memory modules;

moving the stream of air into contact with at least one surface of the at least first and second memory modules; and transferring heat provided by the at least first and second memory modules and a heat rejection component of the refrigeration device not in physical contact with the first and second memory modules to a location downstream of the at least first and second memory modules.

2. The method of claim 1, wherein the heat absorption component comprises an evaporator.

3. The method of claim 1, wherein the heat rejection component comprises a condenser.

4. The method of claim 1, wherein the temperature of the stream of air is reduced to a temperature within a specified safe temperature operating range for the at least first and second memory modules.

5. The method of claim 1, wherein the at least first and second memory modules comprises at least two banks of memory modules.

6. The method of claim 1, wherein the moving of the stream of air is aided by at least one of a fan device, a blower, and an air handler.

7. An apparatus, comprising:
at least a first memory module and a second memory module;
a heat absorption component of a refrigeration device located adjacent to but not in physical contact with each of the at least first and second memory modules at an upstream air flow position relative to an air flow over the at least first and second memory modules; and
a heat rejection component of the refrigeration device, located at a downstream air flow position relative to the air flow over the at least first and a second memory modules and not in physical contact with the at least first and second memory modules, to transfer heat provided by the at least first and second memory modules and the heat rejection component of the refrigeration device to a location downstream of the at least first and second memory modules.

8. The apparatus of claim 7, wherein the heat absorption component and the heat rejection component of the refrigeration device comprise a closed loop refrigeration system.

9. The apparatus of claim 7, wherein the at least first and second memory modules comprises a dual in-line memory module.

10. The apparatus of claim 7, further comprising a printed circuit board to which the refrigeration device and the at least first and second memory modules are mounted.

11. The apparatus of claim 7, further comprising a fan device to circulate the air flow over at least one surface of the at least first and second memory modules.

12. The apparatus of claim 7, wherein the heat absorption component comprises an evaporator.

13. The apparatus of claim 7, wherein the heat rejection component comprises a condenser.

14. The apparatus of claim 7, wherein the heat absorption device reduces a temperature of the air flow at the upstream location to a temperature within a specified safe temperature operating range for the at least first and second memory modules, prior to the air flow over the at least one memory module.

15. The apparatus of claim 7, wherein the at least first and second memory modules comprises at least two banks of memory modules.

16. A system, comprising:
a printed circuit board (PCB);
at least a first memory module and a second memory module mounted to the PCB;
a heat absorption component of a refrigeration device mounted to the PCB and located adjacent to but not in physical contact with each of the at least first and second memory modules at an upstream air flow position relative to the at least one memory module;
a heat rejection component of the refrigeration device, located at a downstream air flow position relative to the at least one first and second memory modules and not in physical contact with either of the at least first and second memory modules; and
an electronic device mounted the PCB.

17. The system of claim 16, wherein the electronic device is at least one of a processor, a microprocessor, and a memory device.

18. The system of claim 16, further comprising a fan device to encourage the direction of the air flow over at least one surface of the at least first and second memory modules.

* * * * *